(12) United States Patent
Iwata

(10) Patent No.: US 9,414,976 B2
(45) Date of Patent: Aug. 16, 2016

(54) BRAKE STRUCTURE FOR MOBILE OBJECT

(71) Applicant: Hiroyasu Iwata, Tokyo (JP)

(72) Inventor: Hiroyasu Iwata, Tokyo (JP)

( * ) Notice: Subject to any disclaimer, the term of this patent is extended or adjusted under 35 U.S.C. 154(b) by 0 days.

(21) Appl. No.: 14/370,093

(22) PCT Filed: Dec. 28, 2012

(86) PCT No.: PCT/JP2012/084085
§ 371 (c)(1),
(2) Date: Jul. 1, 2014

(87) PCT Pub. No.: WO2013/108574
PCT Pub. Date: Jul. 25, 2013

(65) Prior Publication Data
US 2014/0367207 A1   Dec. 18, 2014

(30) Foreign Application Priority Data
Jan. 16, 2012 (JP) ................................ 2012-006563

(51) Int. Cl.
*A61G 5/10* (2006.01)
*B60T 7/10* (2006.01)

(52) U.S. Cl.
CPC ............... *A61G 5/1037* (2013.01); *B60T 7/102* (2013.01); *A61G 5/1016* (2013.01); *A61G 5/1024* (2013.01); *A61G 5/1027* (2013.01)

(58) Field of Classification Search
CPC . A61G 5/1037; A61G 5/1016; A61G 5/1024; B60T 7/102
See application file for complete search history.

(56) References Cited

U.S. PATENT DOCUMENTS

| 4,653,613 | A | * | 3/1987 | Blancas | ................ | 188/24.11 |
| 4,852,697 | A | | 8/1989 | Kulik | | |
| 5,005,674 | A | * | 4/1991 | Piatt | ................ | 188/24.11 |
| 5,626,058 | A | | 5/1997 | Karpowich et al. | | |
| 5,667,236 | A | * | 9/1997 | Murphy | ................ | 280/304.1 |
| 6,007,082 | A | * | 12/1999 | Watwood et al. | ................ | 280/244 |
| 6,854,754 | B1 | * | 2/2005 | Easley, Jr. | ................ | 280/304.1 |

FOREIGN PATENT DOCUMENTS

| JP | 11-113971 A | 4/1999 |
| JP | 2009-011372 A | 1/2009 |
| JP | 2011-067536 A | 4/2011 |

OTHER PUBLICATIONS

International Search Report, dated Apr. 16, 2013, issued in corresponding application No. PCT/JP2012/084085.

* cited by examiner

*Primary Examiner* — Vishal Sahni
(74) *Attorney, Agent, or Firm* — Westerman, Hattori, Daniels & Adrian, LLP

(57) ABSTRACT

A brake structure for a wheelchair having a pair of wheels includes: a braking device for braking one of the pair of wheels; a grip to be held by an operator for a moving operation of the wheelchair, the grip including a base fixed to the wheelchair at any position around one axis along a travel direction A of the wheelchair, extending in such a manner as to protrude from the one axis in a radial direction when viewed from the travel direction of the wheelchair, and being mounted rotatably in one direction; and a braking operation section (a brake wire coupling member and a brake wire) for operating the braking device in accordance with the rotation of the grip. Consequently, the load of a braking operation can be reduced, and the ease of a moving operation during the braking operation can be improved.

10 Claims, 11 Drawing Sheets

BRAKE STRUCTURE FOR MOBILE OBJECT

FIELD

The present invention relates to a brake structure for a mobile object.

BACKGROUND

Conventionally, as described in, for example, Patent Literature 1, a deceleration brake used to reduce speed while traveling in a mobile object including a pair of wheels, such as a wheelchair, is in many cases converted from a hand brake for a bicycle. Such a brake structure, especially a manual attendant-controlled wheelchair, is generally configured such that a hand push handle for an attendant used for a moving operation extends protruding backward with respect to the travel direction of the vehicle body, and a brake lever used for a braking operation is arranged substantially parallel to the hand push handle with a predetermined space therebetween. In this configuration, the attendant (operator) grips the handle and the brake lever together, pulls the brake lever toward the handle, and accordingly can operate the deceleration brake.

On the other hand, as described in, for example, Patent Literature 2, a braking device is also proposed, in which a hand push handle of a wheelchair is pivoted in the up-down direction to enable the switching of the operation and release of a parking brake for fixing a wheel during parking.

CITATION LIST

Patent Literature

Patent Literature 1: Japanese Laid-open Patent Publication No. 2011-67536
Patent Literature 2: Japanese Laid-open Patent

SUMMARY

Technical Problem

However, as described in Patent Literature 1, if the conventional hand brake is applied to a wheelchair, an action to grip the brake lever together with the handle (grip strength) is required to operate the brake. Accordingly, a situation where the burden of the braking operation is heavy is conceivable. For example, especially a long-time operation on a downgrade and a highly frequent operation in a narrow area place a load on the braking operation. Accordingly, fatigue is accumulated and it may involve a danger depending on the scene. Moreover, if the attendant (operator) is a woman or an elderly person, the grip strength of the attendant may be weak, and it may be difficult for him/her to keep gripping the brake for a long time. Moreover, the handle and the brake are spaced. It is required to pull the brake bar toward the handle with the weakest little finger and the ring finger at the time of the braking operation. Accordingly, a firm grip of the brake itself may be difficult if the size of the hand of the attendant is small.

The conventional hand brake also has the structure in which the handle and the brake are gripped. Therefore, there is a problem that the ease of the moving operation is deteriorated at the time of the operation of the deceleration brake. Specifically, for example, more effort is required to perform the braking operation when climbing over a step (tipping), a burden to push up is increased if the braking operation is performed on an upgrade, a burden to maintain the brakes applied is heavy when the braking operation is performed on a downgrade, and a small turn is difficult to make.

On the other hand, the brake structure of the type in which the handle is pivoted in the up-down direction, which is described in Patent Literature 2, has no problem as a parking brake that is mainly switched between ON and OFF. However, if this type of brake structure is used as a deceleration brake, the extension direction of the handle with respect to the travel direction of the wheelchair successively changes since the handle is pivoted for the braking operation. Accordingly, there is a problem that the ease of the moving operation is deteriorated at the time of the braking operation.

The present invention has been made considering the above, and an object thereof is to provide a brake structure for a mobile object, which can reduce the load of the braking operation and improve the ease of the moving operation during the braking operation.

Solution to Problem

In order to achieve the above mentioned object, a brake structure for a mobile object according to the present invention includes a pair of brake structures for braking a pair of wheels individually in a mobile object including the pair of wheels. Each of the pair of brake structures includes: a wheel brake section for braking one of the pair of wheels; a grip to be held by an operator for a moving operation of the mobile object, the grip including a base fixed to the mobile object at any position around one axis along a travel direction of the mobile object, extending in such a manner as to protrude from the one axis in a radial direction as viewed from the travel direction of the mobile object, and being mounted rotatably in one direction; and a braking operation section for operating the wheel brake section in accordance with rotation of the grip.

Further, in the brake structure for a mobile object, it is preferable that the grip extends on a plane passing the base of the grip and being orthogonal to the travel direction of the mobile object or forward of the plane, or extends on a horizontal plane passing the base or downward of the horizontal plane.

Further, in the brake structure for a mobile object, it is preferable that the grip extends on the plane passing the base of the grip and being orthogonal to the travel direction of the mobile object or forward of the plane as well as on the horizontal plane passing the base or upward of the horizontal plane, or extends on the plane passing the base and being orthogonal to the travel direction of the mobile object or backward of the plane as well as on the horizontal plane passing the base or downward of the horizontal plane.

Further, in the brake structure for a mobile object, it is preferable that the grip extends within a total width of the mobile object.

Further, in the brake structure for a mobile object, it is preferable that the grip extends upward or downward as viewed from the travel direction of the mobile object.

Further, in the brake structure for a mobile object, it is preferable that the grip is mounted rotatably around an axis of rotation along the travel direction of the mobile object or a direction tilting with respect to the travel direction, with the base side of the grip as a center of rotation.

Further, in the brake structure for a mobile object, it is preferable that the brake structure for a mobile object according to any one of claim 1, wherein the grip is mounted rotatably with an extension direction of the grip as the axis of rotation.

Advantageous Effects of Invention

A brake structure for a mobile object according to the present invention can operate a wheel brake section and brake a wheel by performing a rotating operation of a grip to be held by an operator for a moving operation of the mobile object. Therefore, the grip action is not required unlike the conventional hand brake, and it becomes possible to perform the braking operation without using the power of the fingers while holding the grip. Hence, the load of the braking operation can be reduced. Moreover, while the moving operation and braking operation of the mobile object can be performed with the same grip, the moving operation and the braking operation can be separated. Therefore, the influence of the braking operation on the moving operation can be reduced, and the ease of the moving operation during the braking operation can be improved.

DESCRIPTION OF EMBODIMENTS

Figure 1:
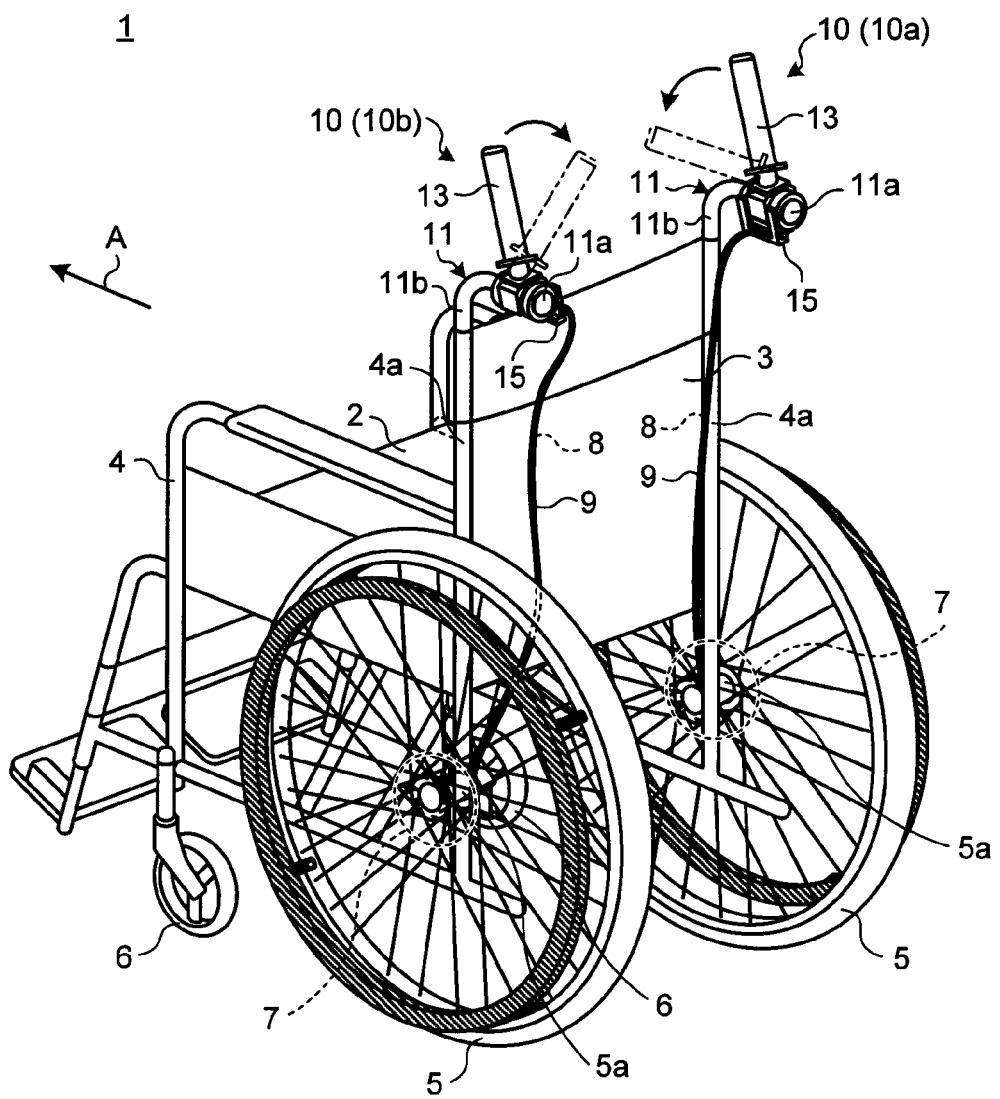
FIG. 1 is a perspective view illustrating a schematic configuration of a wheelchair to which a brake structure according to a first embodiment of the present invention is applied.

Hereinafter, embodiments of a brake structure for a mobile object according to the present invention are described based on the drawings. The same reference numerals are assigned to the same or equivalent parts in the following drawings. Their descriptions thereof are not repeated.

In the following embodiments, a description is given taking a manual attendant-controlled wheelchair as an example of a mobile object to which the brake structure according to the present invention is applied, in other words, a mobile object including a pair of wheels.

[First Embodiment]

A first embodiment of the present invention is described with reference to FIGS. 1 to 5.

Figure 2:
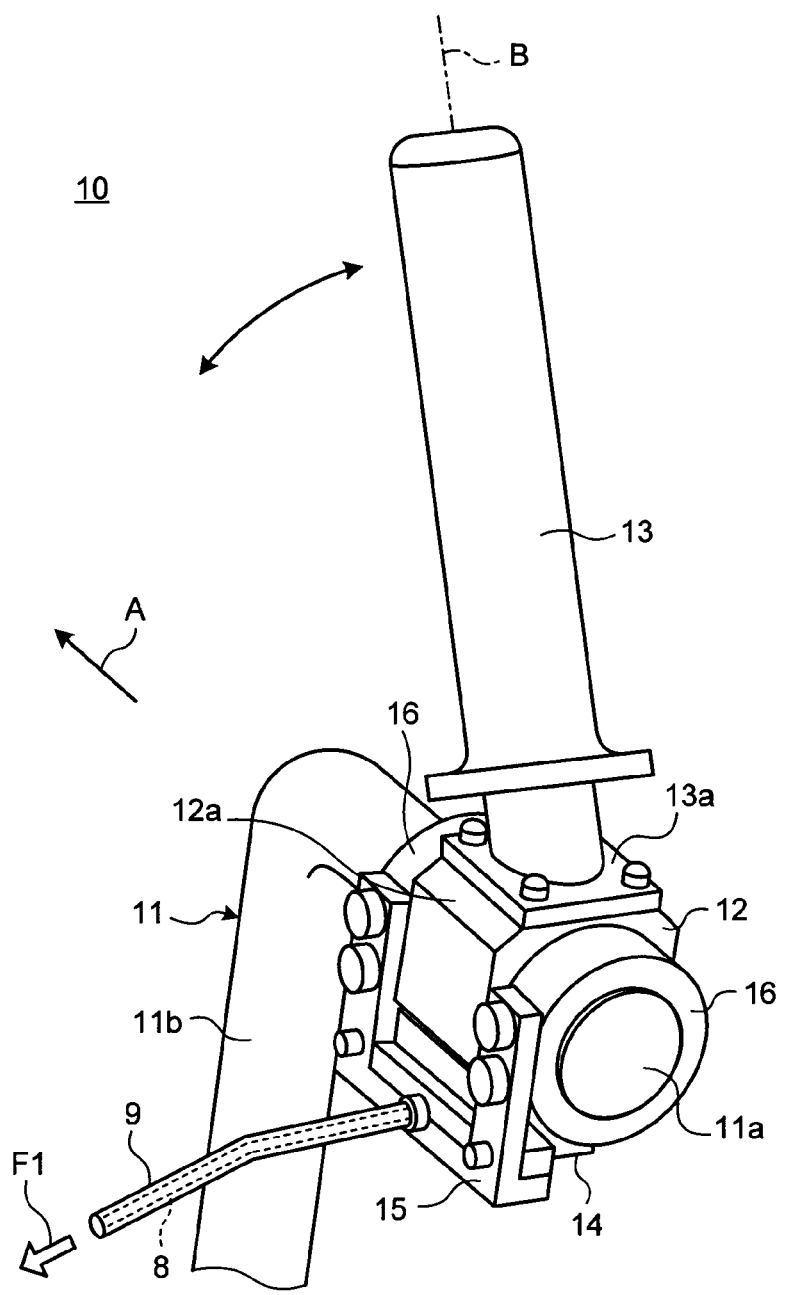
FIG. 2 is a perspective view in which a hand push handle section (a right handle section) in FIG. 1 is enlarged.
Figure 3:
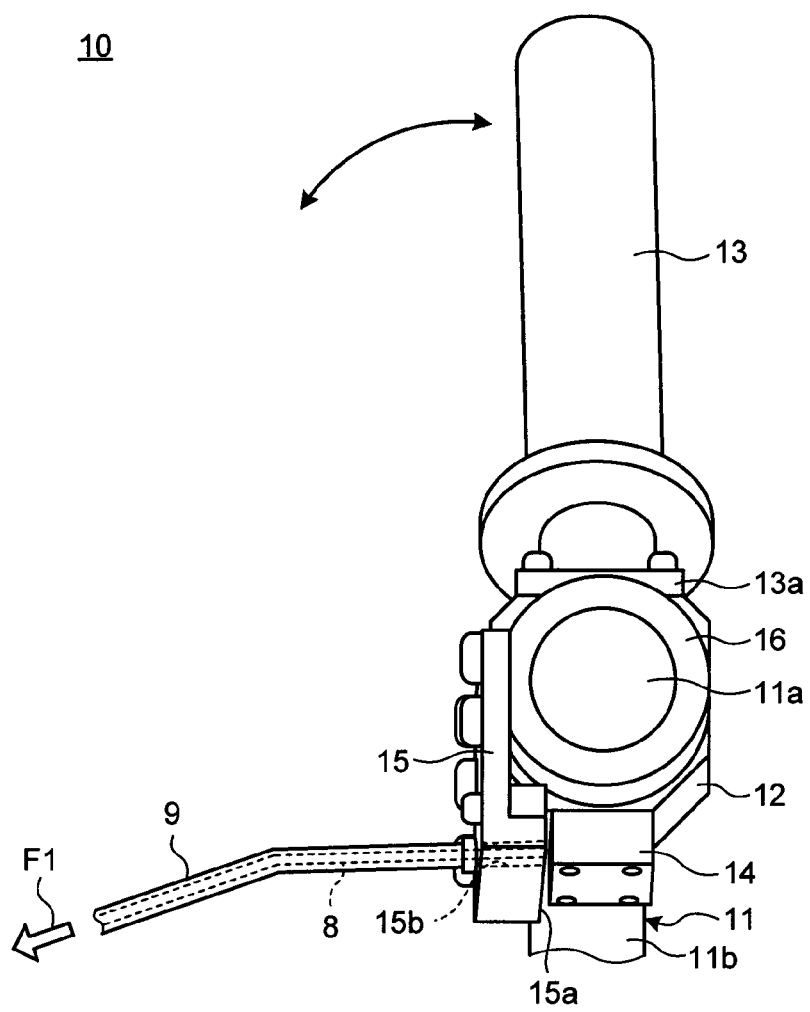
FIG. 3 is a perspective view of the hand push handle section (the right handle section) illustrated in FIG. 2 as viewed from below.

Firstly, the configuration of a brake structure according to the embodiment is described with reference to FIGS. 1 to 3. FIG. 1 is a perspective view illustrating a schematic configuration of a wheelchair 1 to which the brake structure according to the first embodiment of the present invention is applied. FIG. 2 is a perspective view in which a hand push handle section 10 (a right handle section 10a) in FIG. 1 is enlarged. FIG. 3 is a perspective view of the hand push handle section 10 (the right handle section 10a) illustrated in FIG. 2 as viewed from below.

As illustrated in FIG. 1, the wheelchair 1 includes a seat 2 in which a user (hereinafter also described as the "attended person") can seat himself/herself facing a travel direction A, and a back support 3 that supports the back of the user when seated. The seat 2 and the back support 3 are supported by a pipe-shaped frame 4 constructing the skeletal structure of the wheelchair 1. Especially, the back support 3 is attached at both right and left ends to a pair of back support pipes 4a of the frame 4, the pair of back support pipes 4a being arranged on both right and left sides of the back support 3 with respect to the travel direction A and extending upward. The travel direction A of the wheelchair 1 of the present embodiment indicates the front-back direction of the wheelchair 1.

A pair of wheels 5 is arranged on both right and left sides of the seat 2 and the back support 3 with respect to the travel direction A, and pivotally supported by the frame 4 in a rotatable manner. Caster wheels 6 smaller than the wheels 5 are coupled to the frame 4 and respectively arranged in front of the pair of wheels 5.

Each of the pair of wheels 5 includes a braking device 7 (a wheel brake section) for slowing and braking the rotation of the wheel 5. For example, a band brake or drum brake that can hold down an axle and brake the rotation of the wheel 5 during operation, or a disc brake or rim brake that can hold a rim or disc with a brake shoe and brake the rotation of the wheel can be applied to the braking device 7. In the example illustrated in FIG. 1, a drum brake is housed in an axle 5a as an example of the braking device 7.

The braking device 7 is configured such that a brake wire 8 coupled at one end to the braking device 7 is pulled to operate the braking device 7, and accordingly the rotation of the wheel 5 can be braked. The other end of the brake wire 8 is coupled to the hand push handle section 10, which is described later, through a brake tube 9.

Especially in the present embodiment, a pair of the hand push handle sections 10 for allowing an operator (hereinafter also described as the "attendant") to perform the moving and braking operations of the wheelchair 1 is provided above and on both right and left sides of the rear of the back support 3. As illustrated in FIGS. 2 and 3, each of the hand push handle sections 10 includes a handle pipe 11, a rotating portion 12, a grip 13, a brake wire coupling member 14, and a brake tube coupling member 15.

Moreover, the pair of hand push handle sections 10 is constituted by the right handle section 10a arranged on the right side as viewed from the rear with respect to the travel direction A of the wheelchair 1, the right handle section 10a being operated by the operator with the right hand, and a left handle section 10b arranged on the left side and operated with the left hand. The hand push handle section 10 is configured such that the braking devices 7 of the right and left wheels 5 are operated in response to individual operations to rotate the grips 13 of the right handle section 10a and the left handle section 10b (right and left symmetrical operations to tilt inward in the total width direction in the present embodiment), and can brake the pair of right and left wheels 5 individually.

Hereinafter, the components of the hand push handle section 10 are described.

As illustrated in FIG. 1, the handle pipes 11 are L-shape members that extend upward in straight lines continuously from the back support pipes 4a supporting the back support 3 from both sides and are further bent toward the rear side (backward with respect to the travel direction). It is preferred that the handle pipe 11 be arranged such that an axis direction of a part bent toward the rear side (a horizontal portion 11a) agrees with the travel direction A of the wheelchair 1. However, the axis direction of the horizontal portion 11a may be arranged to be tilted in any of up, down, right, and left directions with respect to the travel direction A of the wheelchair 1.

A coupling portion 11b of the handle pipe 11, which linearly extends from the back support pipe 4a, may have a configuration different from FIG. 1 as long as the operator can hold the hand push handle section 10 at the rear of the wheelchair 1. For example, it may be configured such that the handle pipe 11 and the frame 4 are separate members and the coupling portion 11b is coupled and fixed to the frame 4, or it may be configured such that a beam is arranged between the right and left back support pipes 4a in the width direction of the wheelchair 1, and the coupling portion 11b of the handle pipe 11 is fixed to the beam.

As illustrated in FIG. 2, the rotating portion 12 is a member through which the horizontal portion 11a of the handle pipe 11 passes, the member being arranged around the horizontal portion 11a of the handle pipe 11. The rotating portion 12 is provided rotatably around the axis of the horizontal portion 11a of the handle pipe 11.

The grip 13 is a cylindrical (rodlike) member that allows the operator to hold at the time of the moving and braking operations of the wheelchair 1. As illustrated in FIG. 2, the grip 13 is coupled and fixed to the wheelchair 1 by fixedly mounting a base 13a of the grip 13 on an outer surface 12a of the rotating portion 12. The expression "cylindrical" used in the present embodiment refers not only to a shape whose cross sections vertical to the major axis form the same circle regardless of the positions on the major axis, but also a shape having a cross section whose diameter and shape change depending on the position on the major axis so as to fit, for example, the shape of the hand.

Moreover, as illustrated in FIG. 2, when at a reference position at the non-braking time, the grip 13 is configured to be mounted such that the direction of a major axis B of the grip 13 is tilted forward by approximately 30 degrees with respect to the travel direction A of the wheelchair 1 when viewed from the vertically upward direction and to make it possible to improve a fit sense and operability when the operator holds the grip 13. Moreover, the diameter of the grip 13 is, for example, approximately 25 to 35 millimeters, preferably approximately 32 millimeters. The configuration offers easy grip also to women and elderly people who have small hands.

The grip 13 is simply required to extend in such a manner as to protrude vertically upward when viewed from the travel direction A of the wheelchair 1 at the reference position at the non-braking time. In other words, as long as the base 13a of the grip 13 is fixedly mounted at an upper position of the outer surface 12a of the rotating portion 12, the major axis B of the grip 13 can be set while being tilted forward or backward appropriately by any angle when viewed from the vertically upward direction.

Hereafter, the reference position of the grip 13 at the non-braking time is described in detail. The reference position of the grip 13 is not limited to the mounting position and the extension direction, which are illustrated in FIGS. 1 to 3. When at the reference position, the grip 13 is only required to extend in such a manner as to protrude in the radial direction from one axis parallel to the travel direction A of the wheelchair 1 (the axis of the horizontal portion 11a of the handle pipe 11 in the examples of FIGS. 1 to 3). The grip 13 is only required to be fixedly mounted at any position on the outer surface 12a of the rotating portion 12 in accordance with the extension direction and fixed to the wheelchair 1. The major axis B of the grip 13 can be set tilting forward, backward, rightward, or leftward with respect to the travel direction A of the wheelchair 1.

In an area of such a reference position of the grip 13, for example, the following area is more preferred. (1) An area that allows the vicinity of the thenar eminence of the palm (a part at the bases of the forefinger and the thumb) to be put in the center of pressure of operating force at the time of a forward movement operation while the operator is griping the grip 13 with the entire palm (for example, a position where the major axis B is substantially orthogonal to the travel direction A of the wheelchair 1). (2) An area that allows the little finger of the operator to be placed on the base 13a side of the grip 13 while the operator is griping the grip 13 with the entire palm (for example, a conical-shaped area with the base 13a as the vertex, setting the vertically upward direction as the height direction when the base 13a is fixedly mounted on the top of the rotating portion 12, or a conical-shaped area with the base 13a as the vertex, setting the inner direction in the vehicle width direction as the height direction when the base 13a is fixedly mounted on the inner side of the rotating portion 12 in the vehicle width direction (on the left in the case of the right handle section 10a, and on the right in the case of the left handle section 10b))

Moreover, it is preferred that the grip 13 be extended on a plane passing the base 13a of the grip 13 and being orthogonal to the travel direction A of the wheelchair 1, or forward of the plane with respect to the travel direction A, or be extended downward of a horizontal plane passing the base 13a. For example, the base 13a of the grip 13 is fixedly mounted at any position on the outer surface 12a of the rotating portion 12 to set the major axis B of the grip 13 in a direction orthogonal to the outer surface 12a, or set the major axis B of the grip 13 so as to be tilted forward with respect to the travel direction A in the up-down direction or right-left direction. Moreover, the major axis B can be tilted backward with respect to the travel direction A in the down direction or right-left direction.

Furthermore, it is more preferred that the grip 13 extend forward of the plane passing the base 13a and being orthogonal to the travel direction A and upward of the horizontal plane passing the base 13a, or extend backward of the plane passing the base 13a and being orthogonal to the travel direction A and downward of the horizontal plane passing the base 13a. It is still more preferred that the grip 13 extend forward of the plane passing the base 13a and being orthogonal to the travel direction A and upward of the horizontal plane passing the base 13a.

Furthermore, it is more preferred that the grip 13 be placed in such a manner as to extend within the total width of the wheelchair 1 at the reference position at the non-braking time. For example, the grip is not placed at a position where an end of the grip 13 protrudes sideward of the wheel 5 of the wheelchair.

Furthermore, it is preferred at the reference position at the non-braking time that the grip 13 extend in such a manner as to protrude upward or downward from one axis parallel to the travel direction A of the wheelchair 1 (the axis of the horizontal portion 11a of the handle pipe 11 in the examples of FIGS. 1 to 3) when viewed from the travel direction of the wheelchair 1. In other words, it is preferred that the base 13a of the grip 13 be fixedly mounted at the upper or lower position of the outer surface 12a of the rotating portion 12. At this point in time, the major axis B of the grip 13 can be placed while being tilted forward or backward with respect to the vertical direction appropriately by any angle.

Returning to FIG. 2, the description of the components of the hand push handle section 10 is continued. The brake wire coupling member (braking operation section) 14 is fixedly mounted on the outer surface 12a of the rotating portion 12 similarly to the grip 13, and is coupled and connected to the other end (the end opposite to the end coupled to the braking device 7) of the brake wire 8(see FIG. 5). In the present embodiment, as illustrated in FIG. 3, the brake wire coupling member 14 is fixed to the outer surface 12a of the rotating portion 12 at a position opposite to the grip 13 with the rotating portion 12 as the center, and placed vertically below the rotating portion 12 when the brake wire coupling member 14 is at the reference position at the non-braking time.

Therefore, it is configured such that the rotating portion 12, the grip 13, and the brake wire coupling member 14 can integrally rotate around the axis of the horizontal portion 11a of the handle pipe 11. The coupling position of the brake wire 8 to the brake wire coupling member 14 is set such that the brake wire coupling member 14 pulls the brake wire 8 in accordance with such integral rotation of the grip 13 and the brake wire coupling member 14 and accordingly the braking device 7 can be operated. Moreover, the tension of the brake wire 8 causes the brake wire 8 to always apply a biasing force F1 opposite to the pulling direction to the brake wire coupling member 14.

The brake tube coupling member 15 is a member to couple and connect an end of the brake tube 9 extended from the braking device 7. As illustrated in FIG. 2, the brake tube coupling member 15 is fixedly mounted on a pair of housings 16 fixedly mounted on the horizontal portion 11a of the handle pipe 11 on both sides of the rotating portion 12 in the axial direction.

Moreover, as illustrated in FIG. 3, the brake tube coupling member 15 includes a contact surface 15a that is in contact with the brake wire coupling member 14 when at the reference position at the non-braking time, and a communication hole 15b causing the contact surface 15a to communicate with a connection portion to the brake tube 9. The brake wire 8 extended from the braking device 7 passes through the brake tube 9, comes out to the contact surface 15a from the communication hole 15b of the brake tube coupling member 15, and is coupled to the brake wire coupling member 14. The biasing force F1 toward the contact surface 15a side of the brake tube coupling member 15 is always applied to the brake wire coupling member 14 by the tension of the brake wire 8.

The placement of the brake tube coupling members 15 is different between the pair of hand push handle sections 10. As illustrated in FIG. 1, the brake tube coupling members 15 are placed on the inner sides of the wheelchair 1 in the total width direction, in other words, on sides where the hand push handle sections 10 face each other, and are placed in such a manner as to orient the contact surfaces 15a with the brake wire coupling members 14 outward in the total width direction.

In other words, in the right handle section 10a, the brake tube coupling member 15 is fixedly mounted on the housings 16 from the left side when viewed from the travel direction, and the contact surface 15a in contact with the brake wire coupling member 14 is oriented rightward. The brake tube 9 is attached from the left side of the brake tube coupling member 15. The brake wire 8 passes through the communication hole 15b from left to right, comes out to the contact surface 15a side, and is coupled to the brake wire coupling member 14 from the left side.

On the other hand, in the left handle section 10b, the brake tube coupling member 15 is fixedly mounted on the housings 16 from the right side when viewed from the travel direction, and the contact surface 15a in contact with the brake wire coupling member 14 is oriented leftward. The brake tube 9 is attached from the right side of the brake tube coupling member 15. The brake wire 8 passes through the communication hole 15b from right to left, comes out to the contact surface 15a side, and is coupled to the brake wire coupling member 14 from the right side.

In the present embodiment, the brake wire coupling member 14 is fixedly mounted on the rotating portion 12 on the opposite side of the grip 13 with the rotating portion 12 as the center. However, the brake wire coupling member 14 may be configured to be fixedly mounted at another position on the outer surface 12a of the rotating portion 12 as long as the brake wire coupling member 14 can come into contact with the contact surface 15a of the brake tube coupling member 15 when the grip 13 is at the reference position (vertically upward) at the time of the non-braking state. In this case, the contact surface 15a of the brake tube coupling member 15 is also similarly moved in accordance with the shift of the fixing position of the brake wire coupling member 14.

As described above, in the hand push handle section 10, the grip 13 and the brake wire coupling member 14 are fixed to the rotating portion 12 that is rotatable around the handle pipe 11. Accordingly, the rotating portion 12, the grip 13, and the brake wire coupling member 14 integrally rotate in synchronization around the axis of the horizontal portion 11a of the handle pipe 11. Moreover, when at the reference position in the non-braking state (when the brake wire coupling member 14 is located vertically below the rotating portion 12), the contact surface 15a of the brake tube coupling member 15 is in contact with the brake wire coupling member 14. Accordingly, the rotation of the brake wire coupling member 14 from the reference position toward the direction of the contact surface 15a side is regulated, and the rotation of the rotating portion 12 and the grip 13 are also regulated.

In other words, as illustrated in FIG. 1, the rotation areas of the grips 13 are limited to the inner sides of the wheelchair 1 in the total width direction, that is, the sides where the hand push handle sections 10 face each other, with respect to the reference positions at which the grips 13 stand vertically upward. In other words, the grip 13 is set to be rotatable from the reference position toward one direction with the axis of the horizontal portion 11a of the handle pipe 11 as the center of rotation (in a counterclockwise direction in the case of the right handle section 10a and a clockwise direction in the case of the left handle section 10b when viewed from the rear of the travel direction A). The rotation area of the grip 13 can be set in such a manner as to be capable of exerting the maximum braking force at a position tilted by approximately 45 degrees (a state where the conventional hand brake is gripped to the maximum) assuming, for example, that the reference position is zero degree.

In the present embodiment, the brake wire coupling members 14 and the brake wires 8 of the pair of hand push handle sections 10 function as the braking operation sections that operate the braking devices 7 in accordance with the rotation of the grips 13. The braking operation sections, the braking devices 7 mounted respectively on the pair of wheels 5, the grips 13 of the pair of hand push handle sections 10 function as a pair of brake structures according to the present embodiment for braking the pair of wheels 5 individually in the wheelchair 1.

Figure 4:
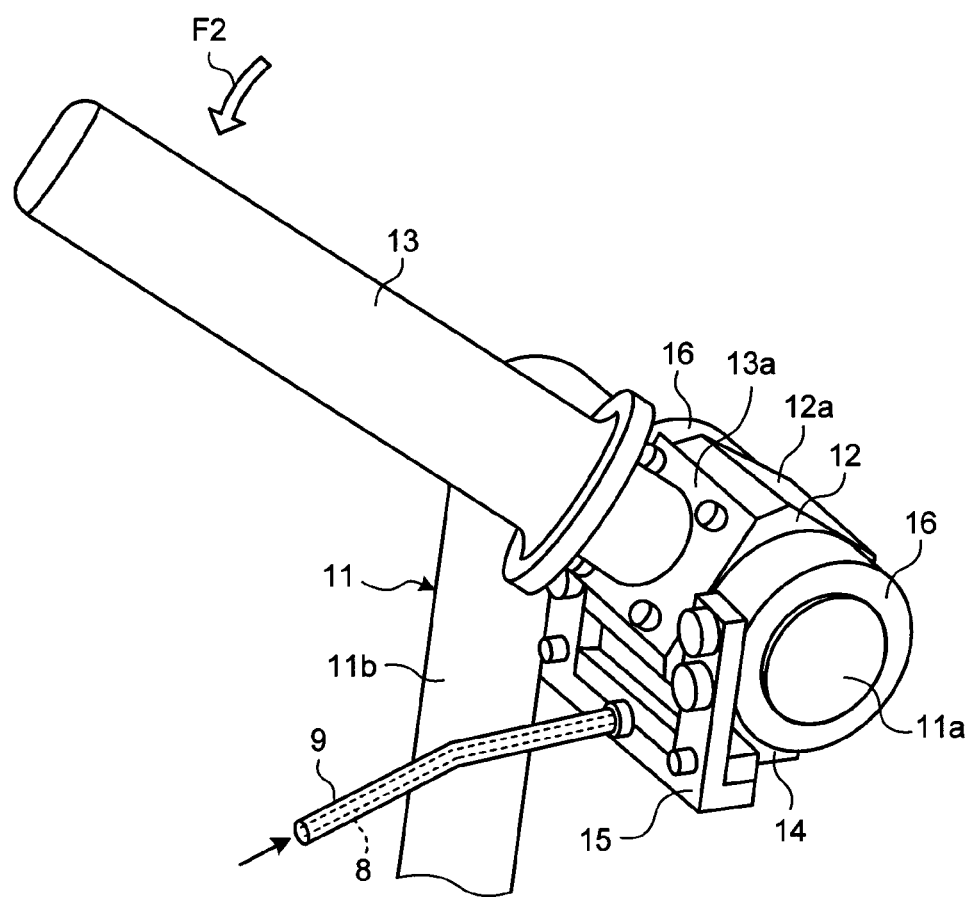
FIG. 4 is a perspective view illustrating the hand push handle section (the right handle section) at the time of a braking operation.
Figure 5:
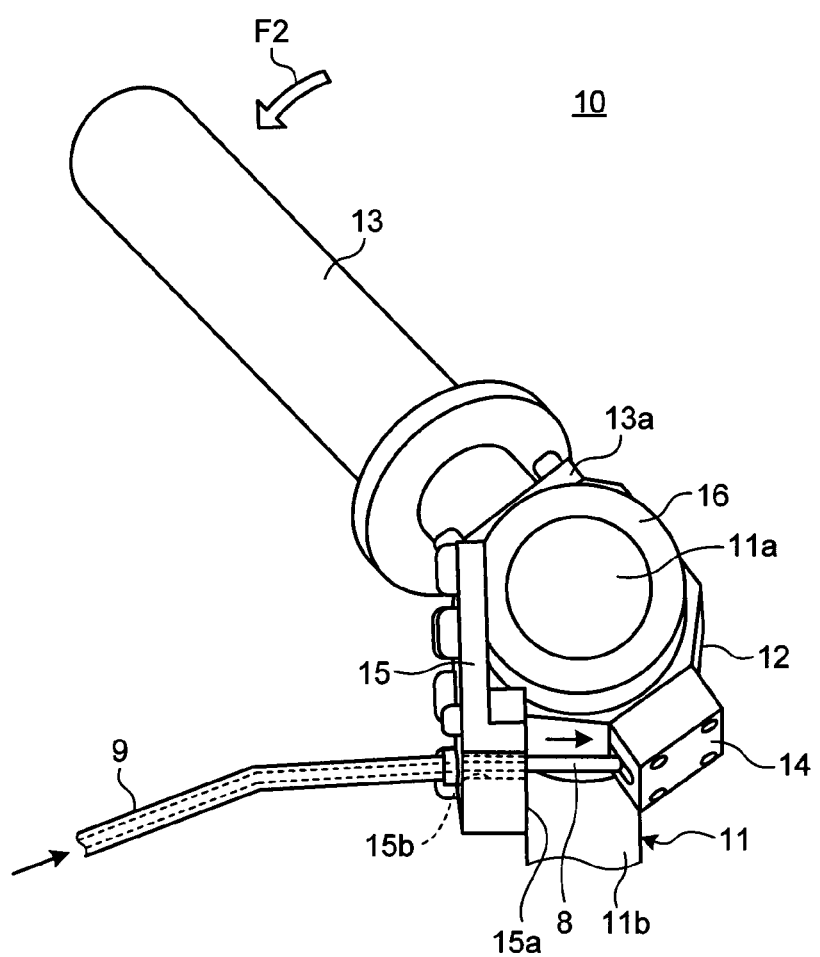
FIG. 5 is a perspective view of the hand push handle section (the right handle section) at the time of the braking operation, which is illustrated in FIG. 4, as viewed from below.

Next, the operation of the brake structure according to the present embodiment is described with reference to FIGS. 2 to 5. FIG. 4 is a perspective view illustrating the hand push handle section 10 (the right handle section 10a) at the time of the braking operation. FIG. 5 is a perspective view of the hand push handle section 10 (the right handle section 10a) at the time of the braking operation, which is illustrated in FIG. 4, as viewed from below. FIGS. 2 to 5 are expanded views of the right handle section 10a of the hand push handle section 10. The right handle section 10a is described in the following description. In the case of the left handle section 10b, the right-left direction and the rotation direction are reversed in the following description.

Firstly, as illustrated in FIGS. 2 and 3, the grip 13 is located above the rotating portion 12 when at the reference position in the non-braking state. On the other hand, the brake wire coupling member 14 is located vertically below the rotating portion 12, and is in contact with the contact surface 15a of the left brake tube coupling member 15 when viewed from the rear of the travel direction A of the wheelchair 1. At this point in time, the biasing force F1 is acting on the brake tube coupling member 15 side (the clockwise direction) of the brake wire coupling member 14 due to the tension of the brake wire 8, and the brake wire coupling member 14 is pressed against the contact surface 15a. Consequently, the brake wire coupling member 14 is held at the position vertically below the rotating portion 12. Accordingly, the grip 13 is also held at the position vertically above the rotating portion 12.

As illustrated in FIGS. 4 and 5, the operator of the wheelchair 1 applies an operating force F2 in the counterclockwise direction to the grip 13 of the hand push handle section 10. If the operating force F2 is larger than the biasing force F1 by the brake wire 8, the grip 13, the rotating portion 12, and the brake wire coupling member 14 integrally rotate against the biasing force F1 in the counterclockwise direction.

With the rotation of the brake wire coupling member 14 in the counterclockwise direction, the brake wire coupling member 14 moves rightward away from the brake tube coupling member 15 fixedly mounted on the housings 16. The brake wire 8 coupled to the brake wire coupling member 14 is drawn rightward from the communication hole 15b of the brake tube coupling member 15 and pulled out.

Since the brake wire 8 is pulled, the braking device 7 connected to the brake wire 8 and mounted on the right wheel 5 operates to brake the right wheel 5. In other words, if the operation to rotate the grip 13 in the counterclockwise direction is performed, the deceleration brake works on the right wheel 5.

In this manner, in the present embodiment, if the operator tilts the grip 13 inward in the width direction of the wheelchair 1 by the pronation/supination of the forearm swing joint while holding the grip 13, the brake is applied. When the grip 13 is tilted by approximately 45 degrees, the maximum wire length that can be pulled in when the brake bar of the old-style hand brake is gripped to the maximum can be exploited, and the maximum braking force can be exerted.

Next, the effect of the brake structure of the present embodiment is described.

The conventional brake for a manual wheelchair is mainly diverted from a bicycle hand brake. In such a hand brake, if the attendant (operator) of the wheelchair attempts to apply the deceleration brake, it is required to keep gripping the handle and the brake lever together. The load of the braking operation is heavy. Hence, the long-time use of the brake does not only cause pain in the fingers due to the concentration of pressure but also invites a decrease in grip strength, and may endanger the user (the attended person) of the wheelchair. Moreover, especially if the operator is a woman or elderly person who has a small hand or weak grip strength, his/her fingers are hard to reach the brake lever so that there are problems that the brake is difficult to be applied and that it is difficult to maintain the braking force.

Hence, the brake structure according to the present embodiment includes a pair of brake structures that brakes the pair of wheels 5 individually in the wheelchair 1 having the wheels 5. Each of the pair of brake structures includes: the braking device 7 that brakes one of the pair of wheels 5; the grip 13 to be held by an operator for the moving operation of the wheelchair 1, the grip 13 having the base 13a fixed to the wheelchair 1 at any position around one axis along the travel direction A of the wheelchair 1, extending in such a manner as to protrude from the one axis in the radial direction when viewed from the travel direction of the wheelchair 1, and being mounted rotatably in one direction; and the braking operation section (the brake wire coupling member 14 and the brake wire 8) that operates the braking device 7 in accordance with the rotation of the grip 13.

With such a configuration, the grip 13 held by the operator for the moving operation of the wheelchair 1 is operated and rotated and accordingly the braking device 7 can be operated to brake the wheel 5. Therefore, the grip action is not required unlike the conventional hand brake, and the braking operation can be performed without using the power of the fingers while the grip 13 is being held. Hence, the degree of fatigue of the hand and fingers of the operator of the wheelchair 1 and pain caused by the grip can be reduced.

Moreover, the braking operation is performed by the rotation of the grip 13 at the time of the braking operation. Accordingly, the action of the arm (the pronation/supination of the forearm swing joint in the present embodiment) having a larger exerting force than the grip action of the conventional hand brake (the grip forces of the fingers) can be used for the braking operation. The exerting force of forearm pronation is generally approximately three times larger than the exerting force at the time of flexing the MP joints (metacarpophalangeal joints) of the fingers, in other words, of the grip action. On the other hand, the tension of the brake wire 8 necessary to operate the braking device 7 is the same. Hence, the operator can easily exert a force necessary for the braking operation and it becomes easier to apply the brake. In this manner, the brake structure of the present embodiment can reduce the load of the braking operation on the operator of the wheelchair 1.

Moreover, with the above configuration, the braking force is determined in accordance with the rotation of the grip 13 unlike the conventional hand brake that secures the braking force by keeping applying the grip strength. Accordingly, it is possible to maintain the braking force as long as the rotation position of the grip 13 can be held. Hence, even during the braking operation, it is possible to keep the direction of a force applied to the grip 13 for the moving operation substantially fixed without changing the operator's way of gripping the grip 13 and gripping positions of the hand and fingers.

In other words, it is possible to reduce the mutual influences of a force applied to the grip 13 by the operator for the braking operation and a force applied to the grip 13 for the moving operation to a minimum and to separate the forces. For example, in the case of the mounting state of the grip 13 in the present embodiment illustrated in FIG. 1 and the like, when the operator grips the grip 13 with the entire palm, the vicinity of the thenar eminence (the part at the bases of the forefinger and thumb) becomes the center of pressure of an operating force at the time of forward movement. On the other hand, the vicinities of the heads of metacarpal bones at the bases of the forefinger and middle finger become the center of pressure of an operating force of rotation for the braking operation.

In this manner, the moving and braking operations of the wheelchair 1 can be performed by the same grip 13. In addition, the moving operation and the braking operation can be separated. Accordingly, the influence of the braking operation on the moving operation can be reduced, and the ease of the moving operation during the braking operation can be improved. In other words, even during the braking operation, the moving operations such as travel on a slope, climbing over a step (tipping), and a turn hardly influence the burden of the braking operation. The operator can implement these operations suitably. From the above, the brake structure of the present embodiment can reduce the load of the braking operation, and the ease of the moving operation during the braking operation can be improved.

Moreover, if the hand push handle section 10 of the present embodiment is compared with the conventional attendant-controlled wheelchair, the conventional attendant-controlled wheelchair generally has a configuration where the handle is provided while the horizontal portion 11a of the handle pipe 11 of the embodiment extends further backward. Hence, if the hand push handle section 10 of the present embodiment is mounted in front of the handle of the conventional attendant-controlled wheelchair, it becomes possible to apply the brake structure of the embodiment to the conventional attendant-controlled wheelchair by retrofitting. Accordingly, cost reduction can be promoted.

Moreover, in the brake structure of the present embodiment, the grip 13 is configured in such a manner as to extend on the plane passing the base 13a of the grip 13 and being orthogonal to the travel direction A of the wheelchair 1, or forward of the plane, or extend on the horizontal plane passing the base 13a or downward of the horizontal plane. With the configuration, the mounting position of the grip 13 can be set to be a position that is easy to apply a force in the moving operation and braking operation directions when the operator grips the grip 13 with the entire palm, such as a position orthogonal to the travel direction A, a position tilting upward and forward of the orthogonal position, or a position tilting downward and backward. Accordingly, the operability of the wheelchair 1 can be further improved.

Moreover, in the brake structure of the present embodiment, the grip 13 is configured in such a manner as to extend on the plane passing the base 13a of the grip 13 and being orthogonal to the travel direction A of the wheelchair 1 or forward of the plane, and on the horizontal plane passing the base 13a or upward of the horizontal plane, or extend on the plane passing the base 13a and being orthogonal to the travel direction of the wheelchair 1 or backward of the plane and on the horizontal plane passing the base 13a or downward of the horizontal plane. With the configuration, the mounting position of the grip 13 can be set to be a position that is easier to apply a force in the moving operation and braking operation directions when the operator grips the grip 13 with the entire palm. Accordingly, the operability of the wheelchair 1 can be still further improved.

Moreover, in the brake structure of the present embodiment, the grip 13 is configured in such a manner as to extend within the total width of the wheelchair 1. With the configuration, it is possible to avoid a configuration where the total width of the wheelchair 1 is increased by the grip 13, for example, the placement of the grip 13 protruding sideward of the wheel 5, and to prevent the area where the wheelchair 1 can travel from being limited.

Moreover, in the brake structure of the present embodiment, the grip 13 is configured in such a manner as to extend upward or downward when viewed from the travel direction of the wheelchair 1. With the configuration, it becomes easy for the operator to hold the grip 13, and apply the operating force to the grip 13. Accordingly, the ease of the moving operation such as travel on a slope, climbing up a step (tipping), or a turn can be still further improved.

Moreover, in the brake structure of the present embodiment, the grip 13 is configured in such a manner as to be mounted rotatably around the axis of rotation along the travel direction A of the wheelchair 1 or a direction tilting with respect to the travel direction A, setting the base 13a side of the grip 13 as the center of rotation. With the configuration, it is possible to use, for the braking operation, the pronation/supination of the forearm or upper arm swing joint that has a larger exerting force than the grip action of the conventional hand brake (the grip forces of the fingers). Accordingly, the load of the braking operation can be still further reduced. Moreover, the direction of a force applied to the grip 13 for the moving operation and the direction of a force for the braking operation can be suitably separated. Accordingly, the ease of the moving operation during the braking operation can be still further improved.

[Second Embodiment]

Figure 6:
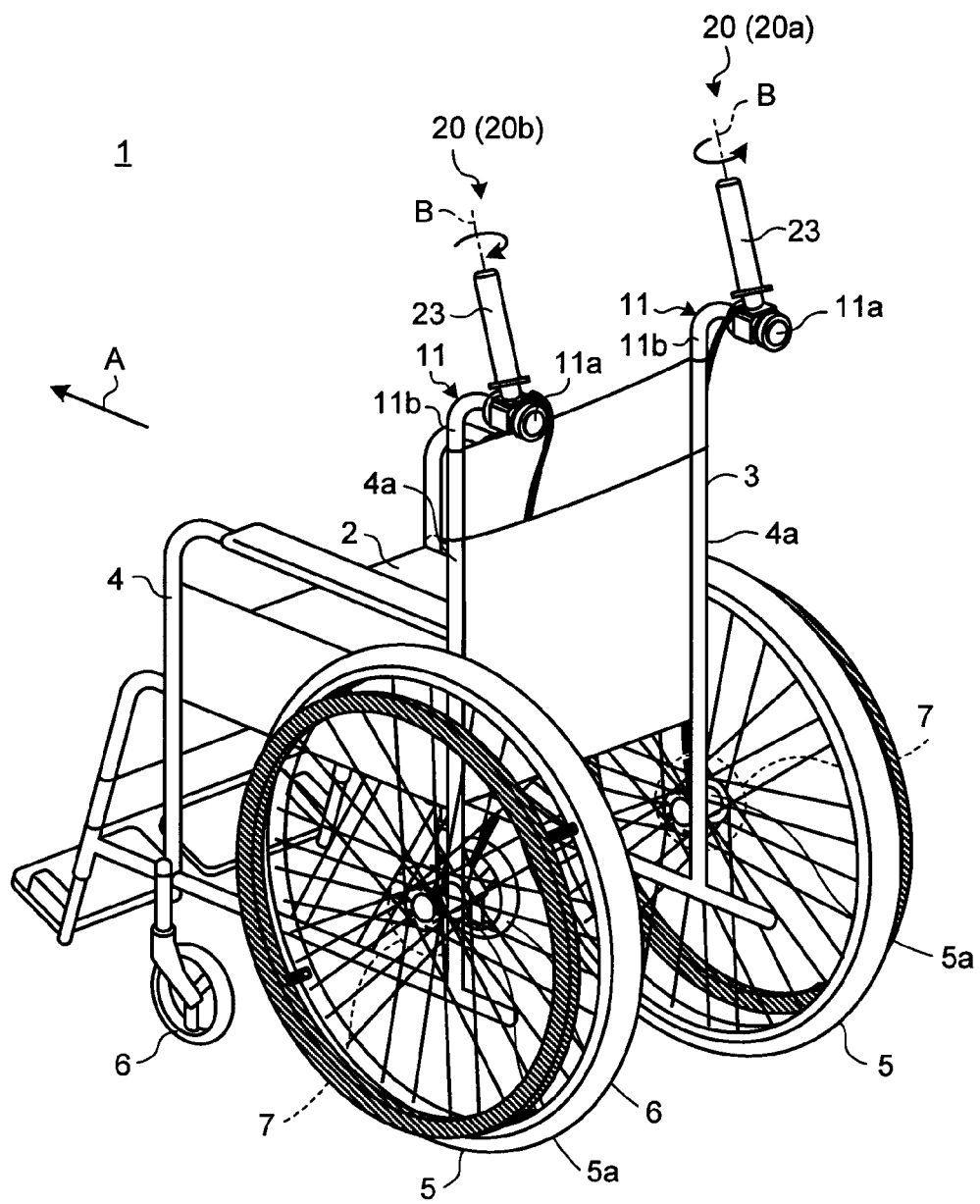
FIG. 6 is a perspective view illustrating a schematic configuration of a wheelchair to which a brake structure according to a second embodiment of the present invention is applied.
Figure 7:
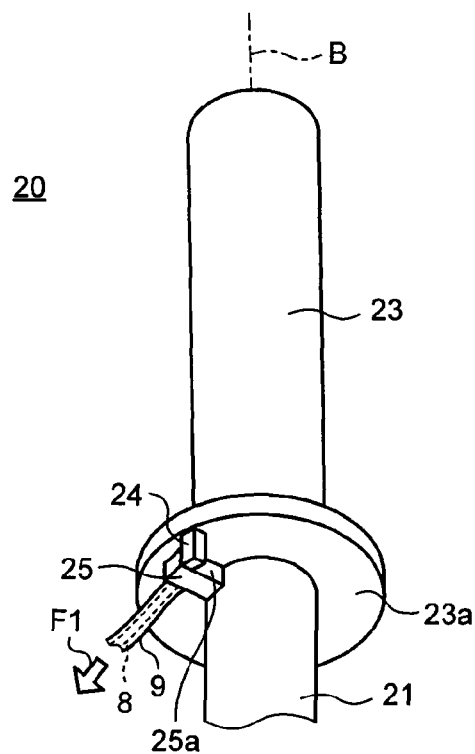
FIG. 7 is a perspective view in which a hand push handle section (a right handle section) in FIG. 6 is enlarged.
Figure 8:
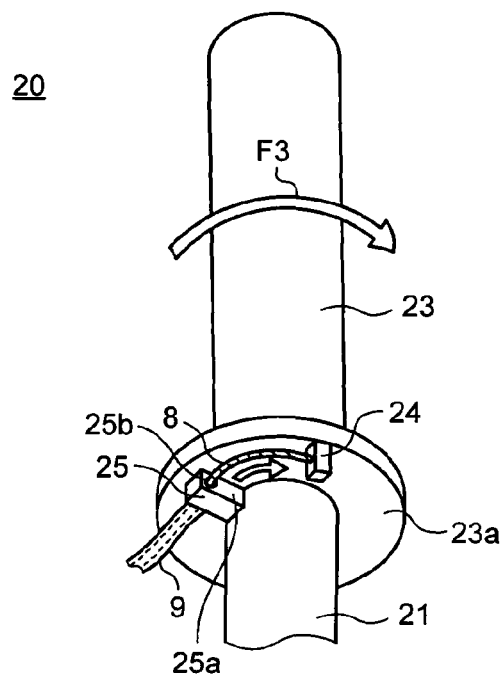
FIG. 8 is a perspective view illustrating a state of the hand push handle section (the right handle section) illustrated in FIG. 7 at the time of the braking operation.

Next, a second embodiment of the present invention is described with reference to FIGS. 6 to 8. FIG. 6 is a perspective view illustrating a schematic configuration of a wheelchair 1 to which a brake structure according to the second embodiment of the present invention is applied. FIG. 7 is a perspective view in which a hand push handle section 20 (a right handle section 20a) in FIG. 6 is enlarged. FIG. 8 is a perspective view illustrating the state of the hand push handle section 20 (the right handle section 20a) illustrated in FIG. 7 at the time of the braking operation.

As illustrated in FIG. 6, the brake structure of the present embodiment is different from the hand push handle section 10 of the first embodiment in that a grip 23 of the hand push handle section 20 is rotatably mounted with an extension direction (the major axis B) of the grip 23 as the axis of rotation.

The hand push handle section 20 includes the right handle section 20a and a left handle section 20b as in the first embodiment. Especially in the present embodiment, the hand push handle section 20 is configured such that braking devices 7 of right and left wheels 5 are operated in accordance with the operation to twist the grip 23 of the right handle section 20a in the counterclockwise direction and the operation to twist the grip 23 of the left handle section 20b in the clockwise direction when viewed from above in the direction of the major axis B of the grip 23. Accordingly, the pair of right and left wheels 5 can be braked individually.

As illustrated in FIG. 7, the hand push handle section 20 includes: the cylindrical grip 23 for the operator to hold at the time of the moving and braking operations of the wheelchair 1; a supporting member 21 that is inserted into the grip 23 from below and supports the rotation of the grip 23, and is fixedly mounted on the handle pipe 11; a disc 23a provided at a lower end of the grip 23 in such a manner to be orthogonal to the major axis B; a brake wire coupling member 24 that is fixedly mounted on a lower surface of the disc 23a and coupled and connected to a brake wire 8 extended from the braking device 7; and a brake tube coupling member 25 that extends in the radial direction from a circumferential surface of the supporting member 21 and is coupled and connected to an end of the brake tube 9 extended from the braking device 7.

Similarly to the brake tube coupling member 15 of the first embodiment, the brake tube coupling member 25 is placed such that a contact surface 25a can come in contact with the brake wire coupling member 24. The brake wire 8 is caused to come out to the contact surface 25a side from the brake tube 9 through a communication hole 25b. Moreover, the disc 23a is configured in such a manner as to be possible to receive a thrust load in the major axis B direction, and can also has a function as a handrest to place the hand when the operator holds the grip 23.

The operation of the brake structure of the present embodiment is described illustrating the right handle section 20a of the hand push handle section 20. In the case of the left handle section 20b, the rotation direction is reversed in the following description.

Firstly, as illustrated in FIG. 7, the brake wire coupling member 24 is in contact with the contact surface 25a of the brake tube coupling member 25 when the brake wire coupling member 24 is at the reference position in the non-braking state. At this point in time, a biasing force F1 is acting on the brake tube coupling member 25 side (a clockwise direction when viewed from above in the major axis B direction) of the brake wire coupling member 24 due to the tension of the brake wire 8, and the brake wire coupling member 24 is pressed against the contact surface 25a. Consequently, the grip 23 is held at the reference position around the major axis B.

As illustrated in FIG. 8, an attendant (operator) of the wheelchair 1 applies an operating force F3 in the counterclockwise direction to the grip 23 of the hand push handle section 20. If the operating force F3 is larger than the biasing force F1 by the brake wire 8, the grip 23 and the brake wire coupling member 24 integrally rotate against the biasing force F1 in the counterclockwise direction with the major axis B as the axis of rotation.

With the rotation of the brake wire coupling member 24 in the counterclockwise direction, the brake wire coupling member 24 moves away from the brake tube coupling member 25 fixedly mounted on the supporting member 21. The brake wire 8 coupled to the brake wire coupling member 24 is drawn from the communication hole 25b of the brake tube coupling member 25 and pulled out.

Since the brake wire 8 is pulled, the braking device 7 connected to the brake wire 8 and mounted on the right wheel 5 operates to brake the right wheel 5. In other words, if the operation to rotate (twist) the grip 23 in the counterclockwise direction with the major axis B as the axis of rotation is performed, the deceleration brake works on the right wheel 5. Such a twist operation can be achieved by the action to flex the hand joint when the operator grips the grip 23 with the entire palm.

In this manner, in the present embodiment, if the operator performs the action to twist the grip 23 inward (counterclockwise in the case of the right handle section 20a, and clockwise in the case of the left handle section 20b) by flexing the hand joint while griping the grip 23, the brake is applied.

The mounting position of the brake wire coupling member 24, in other words, how much distance is required between the brake wire 8 and the center of rotation (the major axis B), can be determined based on the rotation area of the grip 23. For example, assume that when the grip 23 is twisted by approximately 30 degrees, the maximum wire length that can be pulled in when the brake bar of the old-style hand brake is gripped to the maximum can be exploited. The maximum wire length at this point in time is set to be approximately 20 millimeters. The equation of the length of an arc ($L=r\theta$: L is the length of the arc, r is the radius, and $\theta$ is the angle of the arc) is used. If 20 (millimeters) is substituted in the length L of the arc, and $\pi/6$ (=30 degrees) in the angle $\theta$ of the arc, the radius r can be calculated as approximately 40 millimeters. The radius r is the distance in the radial direction from the axis (the major axis B) of a connection position of the brake wire 8 to the brake wire coupling member 24.

In this manner, in the brake structure of the present embodiment, the grip 23 is configured in such a manner as to be rotatably mounted with the extension direction (the major axis B) of the grip 23 as the axis of rotation. With the configuration, it is possible to use, for the braking operation, the flexion movement of the hand joint that has a larger exerting force than the grip action of the conventional hand brake (the grip forces of the fingers). Accordingly, the load of the braking operation can be still further reduced. Moreover, since the extension direction of the grip 23 is fixed regardless of the braking operation, it is possible to keep the direction of a force applied to the grip 23 for the moving operation fixed. The ease of the moving operation during the braking operation can be still further improved.

Next, the effect of the brake structure according to the present embodiment, particularly related to an improvement on the ease of the moving operation of the wheelchair 1, is further described by comparing it with the conventional hand brake with reference to FIGS. 9 to 16.

Figure 9:
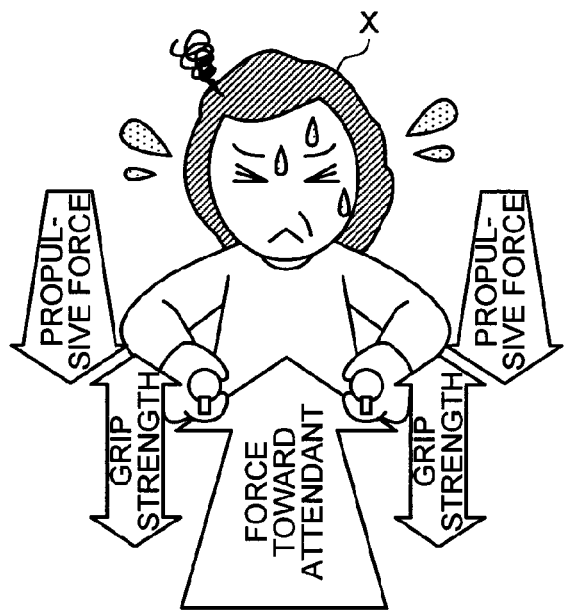
FIG. 9 is a diagram illustrating the relationships between forces at the time of a moving operation of a wheelchair on a slope when a conventional hand brake is applied.
Figure 10:
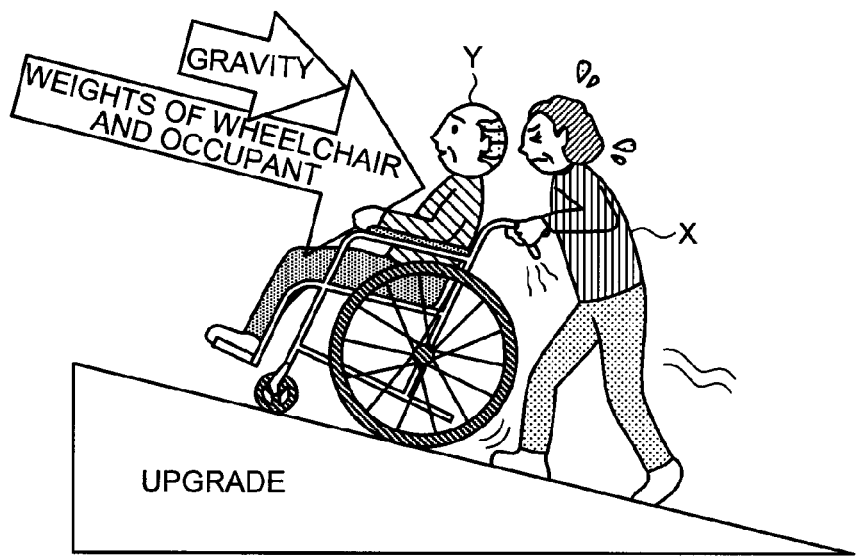
FIG. 10 is a diagram illustrating a situation where the wheel chair is moved up the slop when the conventional hand brake is applied.
Figure 11:
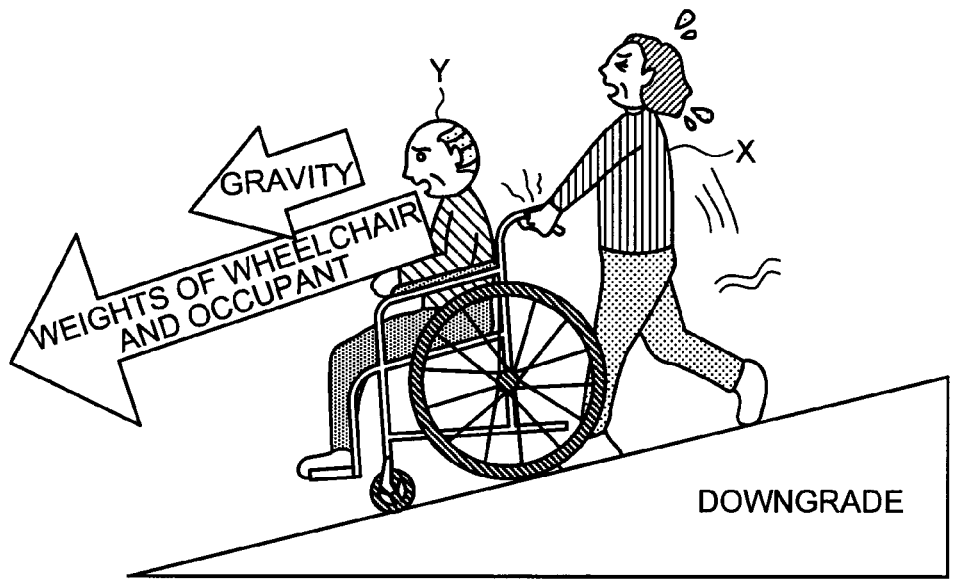
FIG. 11 is a diagram illustrating a situation where the wheel chair is moved down the slope when the conventional hand brake is applied.
Figure 12:
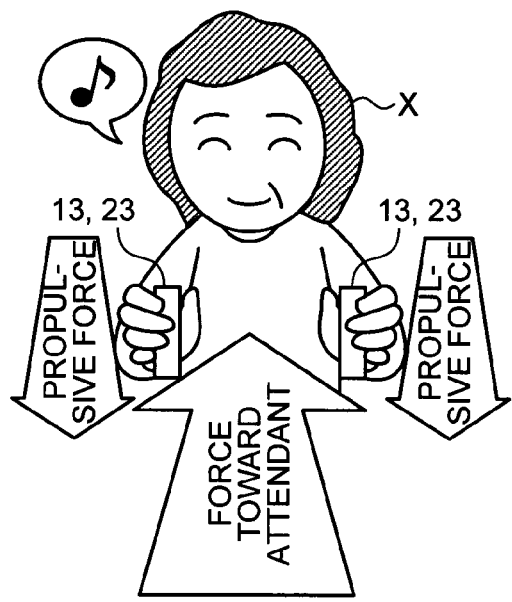
FIG. 12 is a diagram illustrating the relationship between forces at the time of the moving operation of a wheelchair on a slope when the brake structure of the present invention is applied.
Figure 13:
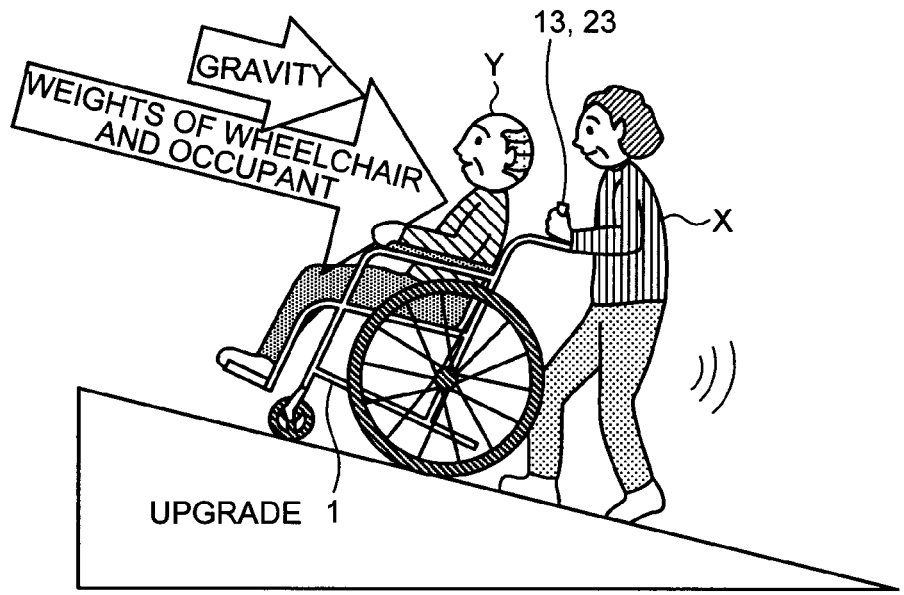
FIG. 13 is a diagram illustrating a situation where the wheel chair is moved up the slope when the brake structure of the present invention is applied.
Figure 14:
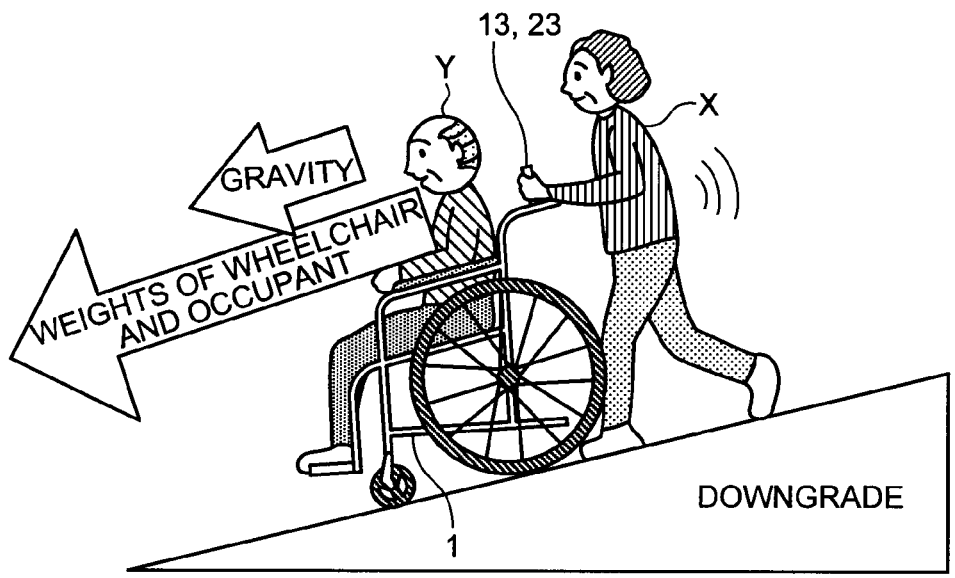
FIG. 14 is a diagram illustrating a situation where the wheel chair is moved down the slope when the brake structure of the present invention is applied.

Firstly, the moving operation of a wheelchair on a slope is described with reference to FIGS. 9 to 14. FIG. 9 is a diagram illustrating the relationships between forces at the time of the moving operation of a wheelchair on a slope when the conventional hand brake is applied. FIG. 10 is a diagram illustrating a situation where the wheelchair is moved up the slope when the conventional hand brake is applied. FIG. 11 is a diagram illustrating a situation where the wheelchair is moved down the slope when the conventional hand brake is applied. FIG. 12 is a diagram illustrating the relationship between forces at the time of the moving operation of a wheelchair on a slope when the brake structure of the present invention is applied. FIG. 13 is a diagram illustrating a situation where the wheelchair is moved up the slope when the brake structure of the present invention is applied. FIG. 14 is a diagram illustrating a situation where the wheelchair is moved down the slope when the brake structure of the present invention is applied.

As illustrated in FIGS. 9 to 11, in order to support the total weight of an attended person Y seated in a wheelchair to which the conventional hand brake is applied, and the wheelchair itself (illustrated as the "force toward the attendant" by the force in the direction of an attendant X from the wheelchair in FIG. 9) in the operations of the wheelchair on a slope, the attendant X who operates the wheelchair needs to exert a force to move the wheelchair while supporting the wheelchair against the weights (illustrated as the "propulsive force" by the force in the direction of the wheelchair from the attendant X in FIG. 9). Furthermore, at the same time, the attendant X is required to exert a force to pull the brake lever (the "grip strength" in FIG. 9) with the fingers while strongly gripping the handle such that the palm does not slip on the handle extending horizontally. The attendant X needs to always maintain the propulsive force and the grip strength during the operations of the wheelchair on the slope. Hence, since it is required to keep flexing the fingers to pull in the brake lever, a very heavy burden is placed on the hand part of the attendant X. The palm slips on the handle unless the power to grip the handle is further increased on an upgrade or downgrade. Accordingly, the attendant X comes to feel extreme fatigue more noticeably.

As illustrated in FIG. 10, when the wheelchair is operated to move up the slope, the total weight of the wheelchair and the attended person Y (described as the "occupant" in FIG. 10) is applied backward with respect to the travel direction (downhill) toward the attendant X due to gravity. Hence, the attendant X needs to keep applying the brakes by keeping exerting the grip strength such that the wheelchair does not move back down the slope, and also to apply the force to push the wheelchair up the slope while supporting the weights of the wheelchair and the attended person Y with the arm and whole body.

As illustrated in FIG. 11, when the wheelchair is operated to move down the slope, the total weight of the wheelchair and the attended person Y (described as the "occupant" in FIG. 11) is applied forward with respect to the travel direction (downhill) away from the attendant X due to gravity. Hence, the attendant X needs to keep supporting the weights of the wheelchair and the attended person Y with the arms and whole body, and to make adjustments in such a manner as to move the wheelchair down the slope at an appropriate speed while keeping applying the brakes by keeping exerting the grip strength such that the wheelchair does not increase speed downhill. Hence, a burden on the attendant X is heavy. The grip strength may be reduced due to fatigue and accordingly the attendant X may drop the handle of the wheelchair, or the attended person Y may feel frightened by the moving operation of the attendant X.

In contrast, as illustrated in FIGS. 12 to 14, in the wheelchair 1 to which the brake structure of the present invention is applied, the attendant X is free from friction between the palm and the handle in the operation of the wheelchair on the slope. The braking operation simply requires the rotation of the grip 13 or 23. Accordingly, the grip strength is no more required, and attention can be focused on the moving operation of the wheelchair 1. Moreover, the force toward the attendant X can be received by the palm and whole arm. Accordingly, it is easy to support.

As illustrated in FIG. 13, when the wheelchair 1 is operated to move up the slope, the attendant X is simply required to push the grip 13 or 23 in a large area from the base of the thumb to the palm in such a manner as to transmit, to the handle (the grip 13 or 23), the power to advance transmitted from the shoulder and upper arm. Since there is no brake lever, the attendant X does not need to keep gripping the brake firmly by the fingers during the braking operation. Therefore, a burden is not placed on the fingers of the attendant X. Furthermore, the propulsive force to advance the wheelchair 1 is exerted by the muscles of the chest and shoulder. On the other hand, the muscles of the upper arm and forearm related to rotation (pronation and a flexion movement) are used to rotate the grip 13 or 23 at the time of braking. Hence, burdens on the muscles used by the attendant X during the moving operations can appropriately be distributed. In addition, since the muscles of the arm and chest are used, an allowance for the maximum exerting force of each muscle is much larger than the fingers. Hence, it is conceivable that the brake structure of the present invention can make the attendant (operator) X to feel less tired than the conventional hand brake.

As illustrated in FIG. 14, as in the case of the upgrade, also when the wheelchair 1 is operated to move down the slope, the attendant X does not need to keep gripping the brake firmly with the fingers, which facilitates the support of the weights of the wheelchair 1 and the attended person Y (described as the "occupant" in FIG. 14). Attention can be focused on the moving operations of the wheelchair 1. Moreover, when moving back, the backward propulsive force can be transmitted by the whole of four fingers to the grip 13 or 23. Accordingly, it is possible to make the attendant (operator) X to feel the moving operation easier.

Next, the operation to climb over a step (tipping) of the wheelchair 1 is described with reference to FIGS. 15 and 16.

Figure 15:
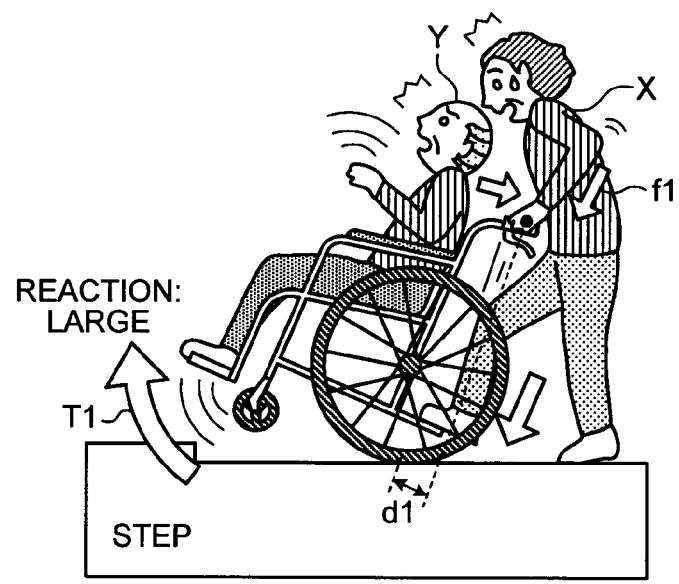
FIG. 15 is a diagram illustrating a situation of a tipping operation of the wheelchair when the conventional hand brake is applied.

FIG. 15 is a diagram illustrating a situation of a tipping operation of a wheelchair when the conventional hand brake is applied. FIG. 16 is a diagram illustrating a situation of the tipping operation of a wheelchair when the brake structure of the present invention is applied.

As illustrated in FIG. 15, in the tipping operation of the wheelchair, the wheelchair to which the conventional hand brake is applied applies a force f1 in such a manner as to press a horizontal handle (grip) downward. At this point in time, a moment arm is a distance d1 between a point crossing the ground by extending a direction of the pressing force f1 and a contact point of the wheel with the ground. Therefore, a torque T1 for performing a wheelie on the wheel to climb over a step is the product of the force f1 acting on the handle and the moment arm d1, (T1=f1×d1).

Figure 16:
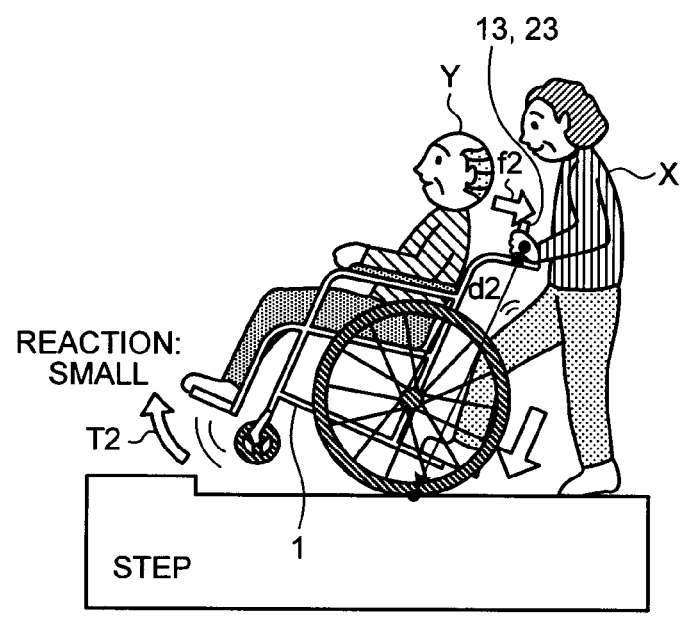
FIG. 16 is a diagram illustrating a situation of the tipping operation of a wheelchair when the brake structure of the present invention is applied.

On the other hand, as illustrated in FIG. 16, in the wheelchair 1 to which the brake structure of the present invention is applied, the action to pull the vertical handle (the grip 13 or 23) back enables the tipping operation of the wheelchair 1. Assuming that the force to pull the vertical handle (the grip 13 or 23) backward for the action is f2, the moment arm is a height d2 from the point of action of the force f2 to the ground. Therefore, a torque T2 of the brake structure of the present invention is T2=f2×d2.

Comparing the moment arm d1 in the case of tipping with the conventional hand brake with the moment arm d2 in the case of tipping with the brake structure of the present invention, d2 is approximately five times longer than d1, as illustrated in FIGS. 15 and 16. Hence, if the torques T1 and T2 necessary for a wheelie are assumed to be the same, and a kick force of the leg is ignored, the force f1 to act on the handle of the wheelchair to which the conventional hand brake is applied is approximately five times larger than the force f2 required by the wheelchair 1 to which the brake structure of the present invention is applied.

From this point, it is also possible to mechanically prove that it is overwhelmingly easy to perform the tipping operation on the wheelchair 1 to which the brake structure of the present invention is applied as compared with the wheelchair to which the conventional hand brake is applied. The conventional wheelchair requires a large force in tipping and accordingly has no choice but to exert a large force momentarily. As illustrated in FIG. 15, the behavior of the wheelchair becomes accelerating in reaction to this, and the wheelchair is rotated and moved backward with greater force than the attendant X's expectation. Consequently, a situation where the attended person Y becomes frightened may be invited. In contrast, as illustrated in FIG. 16, the wheelchair 1 to which the brake structure of the present invention is applied does not require such a large force as compared with the conventional wheelchair. A backward force is required to be gently applied to the grip 13 or 23. Moreover, the grip 13 or 23 is gripped from the rear. Accordingly, even if the wheelchair 1 rotates backward with a greater force than the attendant X's expectation, the attendant X can support the wheelchair 1 with the palm without difficulty. Accordingly, a reaction that frightens the attended person Y can be suppressed. Therefore, with the wheelchair 1 to which the brake structure of the present invention is applied, the tipping operation can be performed easily and safely without frightening the attended person Y.

Next, a turning operation of the wheelchair is described. In the wheelchair to which the conventional hand brake is applied, it is necessary to transmit a force to advance through an outer handle on a farther side from the center of the turn, with a single hand gripping the outer handle. At this point in time, there arises the need to exert the grip strength approximately twice as large as usual so as to prevent the palm from slipping on the handle. Accordingly, it is easy to feel a heavier burden.

In contrast, in the wheelchair 1 to which the brake structure of the present invention is applied, while the outer handle (the grip 13 or 23) keeps being pushed with the palm during a turn, the other handle (the grip 13 or 23) is rotated. The inner wheel stops subsequently. With the inner wheel as the center, it is easy to make a turn on the spot. At this point in time, the force to advance is transmitted only by the outer handle. However, the transmission efficiency of the force transmitted from the chest and shoulder through the arm is very high. Hence, when a turn is smaller, the wheelchair 1 to which the brake structure of the present invention is applied can make the operator (the attendant X) feel that the wheelchair 1 is more capable of a small turn than the conventional wheelchair.

Up to this point, the present invention has been described illustrating the preferred embodiments. However, the present invention is not limited by these embodiments. The present invention may be configured by a combination of a plurality of the embodiments described above, or the components of the embodiments may be changed to those that can be easily replaced by those skilled in the art or those substantially the same.

In the above embodiments, the wheelchair 1 has been illustrated and described as an example of the mobile object to which the brake structure according to the present invention is applied. However, it is sufficient if the mobile object includes at least a pair of wheels, and the brake structures can brake the pair of wheels of the mobile object individually. The brake structure according to the present invention can be applied to, for example, a rollator, a self-propelled vehicle, a bicycle, an electric-powered wheelchair, and a stroller, which assist walking actions of a user.

Moreover, in the above embodiments, the wheelchair 1 has been illustrated as an example of the mobile object which is configured such that the right wheel 5 is braked by the braking operation of the right handle section 10a and the left wheel 5 is braked by the braking operation of the left handle section 10b. However, a pair of brake structures may be in a different configuration, for example, where wheels targeted to be braked are reversed right and left, as far as the structure is respectively in a one-to-one relationship with a pair of wheels.

Moreover, in the above embodiments, rotation around one axis along the travel direction A (the first embodiment) and rotation around the major axis B (the second embodiment) have been illustrated as rotation of the grips 13 and 23. However, rotation can be made in another direction, as long as it is possible to avoid influences in which an unnecessary brake is applied while moving in the front-back direction and climbing over a step and in which the braking operation is performed by a force applied to the grip for the moving operation.

Moreover, as described in the above embodiment, the rotation operations of the grips 13 are preferred to be the same and right and left symmetrical operations at the right handle section 10a and the left handle section 10b. However, the rotation operations of the grips 13 may be operations different between right and left, or operations asymmetrical between right and left.

In the above embodiments, the deceleration brake to reduce speed while traveling is cited as the braking device 7. However, the brake structure according to the present invention can also be applied to a parking brake to lock wheels.

REFERENCE SIGNS LIST

1 Wheelchair (mobile object)
5 Wheel
7 Braking device (wheel brake section)
8 Brake wire (braking operation section)
10, 20 Hand push handle section
10a, 20a Right handle section
10b, 20b Left handle section
13, 23 Grip
13a Base of the grip
14, 24 Brake wire coupling member (braking operation section)
A Travel direction
B Major axis of the grip

The invention claimed is:

1. A brake structure for a mobile object comprising a pair of brake structures for braking a pair of wheels individually in a mobile object including the pair of wheels, each of the pair of brake structures comprising:
   a wheel brake section for braking one of the pair of wheels;
   a grip to be held by an operator for a moving operation of the mobile object, the grip including a base connected to the mobile object, the grip extending in such a manner as to protrude from the one axis in a radial direction as viewed from a travel direction of the mobile object, and the grip being pivotable in one direction from a fixed reference position associate with a non-braking action; and
   a braking operation section for operating the wheel brake section in accordance with a pivot position of the grip, wherein
   the grip is coupled and fixed to the mobile object and configured to pivot by fixedly mounting the base of the grip to an outer surface of a rotating member, and
   the rotating member is provided rotatably around an outer surface of a handle pipe of said mobile object.

2. The brake structure for a mobile object according to claim 1, wherein the grip extends on a virtual plane being orthogonal to the travel direction of the mobile object or forward of the virtual plane, or extends on a virtual horizontal plane or downward of the virtual horizontal plane, the base of the grip being disposed on a crossing part between the virtual plane and the virtual horizontal plane.

3. The brake structure for a mobile object according to claim 2, wherein the grip extends on the virtual plane being orthogonal to the travel direction of the mobile object or forward of the virtual plane as well as on the virtual horizontal plane or upward of the virtual horizontal plane, or extends on the virtual plane and being orthogonal to the travel direction of the mobile object or backward of the virtual plane as well as on the virtual horizontal plane or downward of the horizontal plane, the base of the grip being disposed on a crossing part between the virtual plane and the virtual horizontal plane.

4. The brake structure for a mobile object according to claim 1, wherein the grip extends within a total width of the mobile object.

5. The brake structure for a mobile object according to claim 1, wherein the grip extends upward or downward as viewed from the travel direction of the mobile object.

6. The brake structure for a mobile object according to claim 2, wherein the grip extends within a total width of the mobile object.

7. The brake structure for a mobile object according to claim 3, wherein the grip extends within a total width of the mobile object.

8. The brake structure for a mobile object according to claim 2, wherein the grip extends upward or downward as viewed from the travel direction of the mobile object.

9. The brake structure for a mobile object according to claim 3, wherein the grip extends upward or downward as viewed from the travel direction of the mobile object.

10. The brake structure for a mobile object according to claim 4, wherein the grip extends upward or downward as viewed from the travel direction of the mobile object.

\* \* \* \* \*